US009758025B2

(12) United States Patent
Kawazu et al.

(10) Patent No.: US 9,758,025 B2
(45) Date of Patent: Sep. 12, 2017

(54) SUNROOF APPARATUS

(71) Applicant: AISIN SEIKI KABUSHISIKI KAISHA, Kariya-shi, Aichi-ken (JP)

(72) Inventors: Aisei Kawazu, Nagoya (JP); Yusuke Kokubo, Atsugi (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/097,609

(22) Filed: Apr. 13, 2016

(65) Prior Publication Data

US 2016/0303955 A1 Oct. 20, 2016

(30) Foreign Application Priority Data

Apr. 14, 2015 (JP) ................. 2015-082745

(51) Int. Cl.
*B60J 7/043* (2006.01)
*B60J 7/05* (2006.01)
*B60J 7/02* (2006.01)

(52) U.S. Cl.
CPC ............. *B60J 7/043* (2013.01); *B60J 7/02* (2013.01); *B60J 7/022* (2013.01); *B60J 7/05* (2013.01)

(58) Field of Classification Search
CPC ....... B60J 7/02; B60J 7/05; B60J 7/022; B60J 7/043

USPC ............................ 296/216.01–224
See application file for complete search history.

(56) References Cited

U.S. PATENT DOCUMENTS

| 4,553,307 A | * | 11/1985 | Kaltz | ................. B60J 7/022 29/401.1 |
| 4,671,565 A | * | 6/1987 | Grimm | ................. B60J 7/057 296/213 |
| 5,154,482 A | | 10/1992 | Hayashi et al. | |
| 2015/1009133 | | 4/2015 | Ohdoi et al. | |

FOREIGN PATENT DOCUMENTS

JP      2006-27493      2/2006

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes: a movable panel adapted to open and close an opening formed in a vehicle roof; a guide rail provided in each edge portion of the opening in a lateral direction, and extending in a longitudinal direction; a support bracket including a front end portion supported by the guide rail, and supporting each edge portion of the movable panel; and a shoe member provided such that the shoe member can be moved along the guide rail, and engaged with the support bracket, wherein the movable panel is opened and closed along with movement of the shoe member, and the shoe member includes a limiting protrusion portion protruding in the lateral direction at a position higher than an upper surface of the guide rail, and is in contact with or is close to the upper surface.

6 Claims, 6 Drawing Sheets

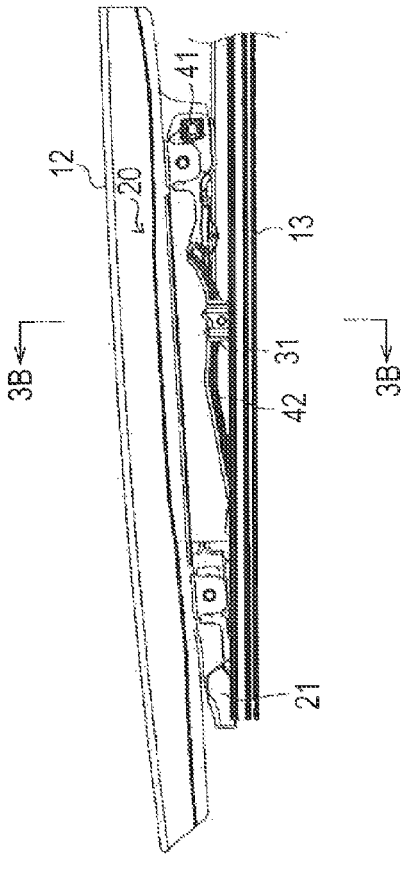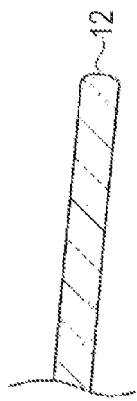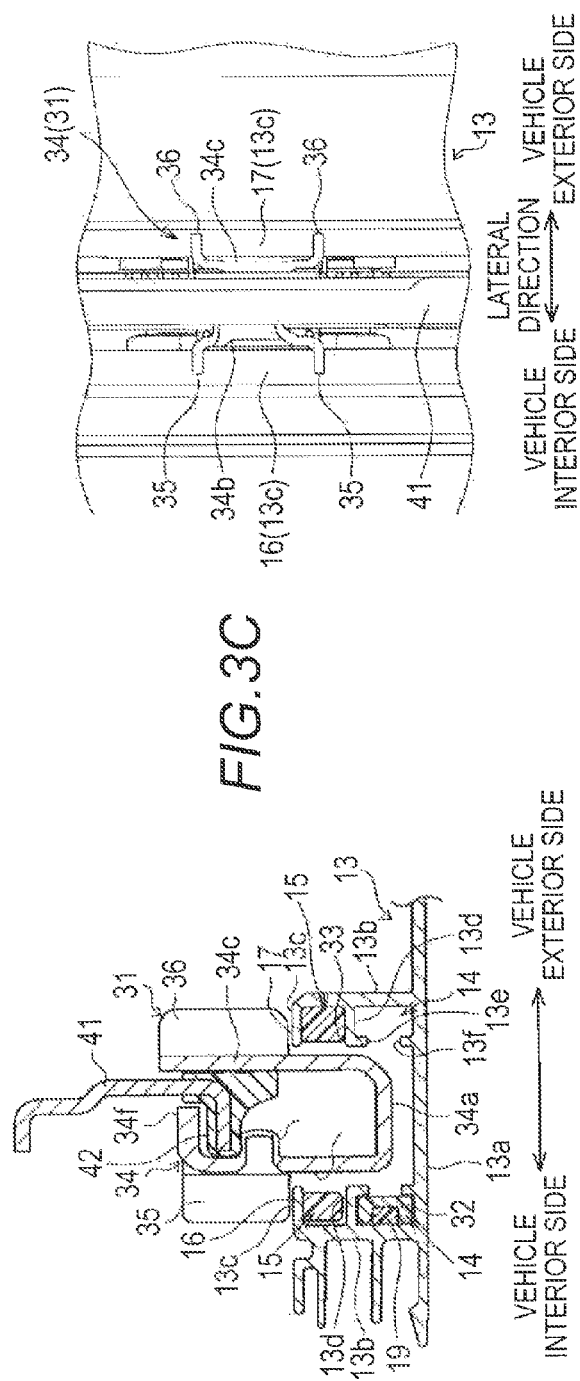

VEHICLE INTERIOR SIDE ⟵⟶ VEHICLE EXTERIOR SIDE

SUNROOF APPARATUS

CROSS REFERENCE TO RELATED APPLICATIONS

This application is based on and claims priority under 35 U.S.C. §119 to Japanese Patent Application 2015-082745, filed on Apr. 14, 2015, the entire contents of which are incorporated herein by reference.

TECHNICAL HELD

This disclosure relates to a sunroof apparatus.

BACKGROUND DISCUSSION

JP 2006-27493A (Reference 1) discloses a sunroof apparatus in the related art. This sunroof apparatus includes guide rails that are respectively provided in edge portions of an opening, which is formed in a roof of a vehicle, in a lateral direction of the vehicle, and shoe members (drive shoes) which are respectively provided along the guide rails such that the shoe members can be moved in a longitudinal direction of the vehicle. The sunroof apparatus includes support brackets, each of which includes a front end portion connected turnably to the guide rail, and a rear end portion engaged with the shoe member, and which support a movable panel which opens and closes the opening. When the shoe member is moved relative to the support bracket in the longitudinal direction of the vehicle, the support bracket is turned such that the rear end portion is pivotally moved upward and downward around the front end portion. Accordingly, the movable panel is opened and closed between a fully closed position and a tilt-up position.

Particularly, when the movable panel is present at the tilt-up position, a holding portion provided in the shoe member is engaged with a guide groove formed in the support bracket such that the holding portion holds the support bracket in a turning direction of the support bracket. Accordingly, bending moment applied to a rear end of the support bracket is reduced such that the twisting of the movable panel supported by the support bracket can be prevented.

In the sunroof apparatus disclosed in Reference 1, bending moment around an axis substantially along the longitudinal direction of the vehicle may be applied to the shoe member, and thus, it is required that strength (hereinafter, also referred to as "strength in the lateral direction of the vehicle") of the shoe member against the bending moment is ensured.

SUMMARY

Thus, a need exists for a sunroof apparatus which is not suspectable to the drawback mentioned above.

A sunroof apparatus according to an aspect of this disclosure includes: a movable panel that is adapted to open and close an opening formed in a roof of a vehicle; a guide rail that is provided in each edge portion of the opening in a lateral direction of the vehicle, and extends in a longitudinal direction of the vehicle; a support bracket that includes a front end portion supported by the guide rail, and supports each edge portion of the movable panel in the lateral direction of the vehicle; and a shoe member which is provided such that the shoe member can be moved along the guide rail in the longitudinal direction of the vehicle, and which is engaged with the support bracket. The movable panel is opened and closed along with movement of the shoe member in the longitudinal direction of the vehicle. The shoe member includes a limiting protrusion portion that protrudes in the lateral direction of the vehicle at a position higher than an upper surface of the guide rail, and is in contact with or is close to the upper surface.

BRIEF DESCRIPTION OF THE DRAWINGS

The foregoing and additional features and characteristics of this disclosure will become more apparent from the following detailed description considered with the reference to the accompanying drawings, wherein:

FIGS. 3A to 3C illustrate the structure of the sunroof apparatus in the embodiment, FIG. 3A is a side view, FIG. 3B is a sectional view taken along line 3B-3B in FIG. 3A, and FIG. 30 is a top view;

FIG. 5A is a side view of the body portion viewing from the outside in a lateral direction of a vehicle, FIG. 5B is a top view of the body portion, FIG. 5C is a side view of the body portion viewing from the inside in the lateral direction of the vehicle, and FIG. 5D is a front view of the body portion viewing from the front of the vehicle;

DETAILED DESCRIPTION

Hereinafter, one embodiment of a sunroof apparatus will be described. In the following description, a longitudinal direction of a vehicle is referred to as a "longitudinal direction". The inside of the vehicle in a lateral direction of the vehicle, which indicates a passenger compartment side, is referred to as a "vehicle interior side". The outside of the vehicle in the lateral direction, which indicates the outside of the passenger compartment, is referred to as a "vehicle exterior side".

Figure 1:
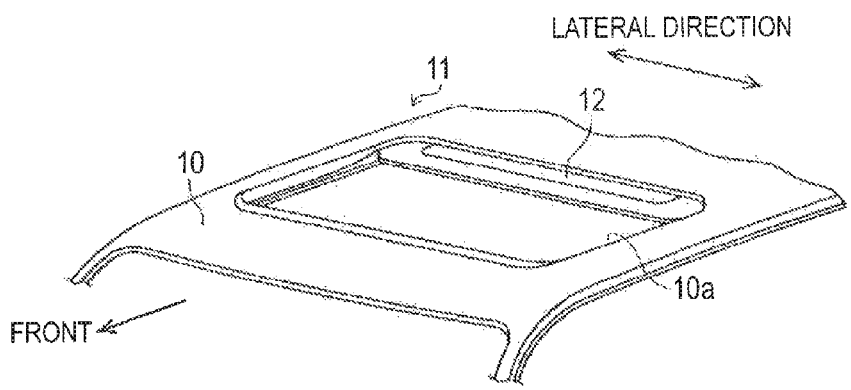
FIG. 1 is a perspective view illustrating the structure of a sunroof apparatus in one embodiment.

As illustrated in FIG. 1, a substantially rectangular opening 10a is formed in a roof 10 of a vehicle such as an automobile, and a sunroof apparatus 11 is mounted on the roof 10. The sunroof apparatus 11 includes a substantially rectangular movable panel 12 made of a glass plate or the like, which is moved in the longitudinal direction to open and close the opening 10a.

The movable panel 12 is attached to be capable of a tilt-up operation in which a rear portion of the movable panel 12 is turned around a front portion of the movable panel 12 in one direction and is moved upward, atilt-down operation in which the rear portion is turned around the front portion in the other direction and is moved downward, and a slide operation in which the movable panel 12 is slid in the longitudinal direction. A so-called inner sliding method for opening and closing the movable panel 12 is adopted, in which the movable panel 12 is slid in a tilt-down state.

Figure 2:
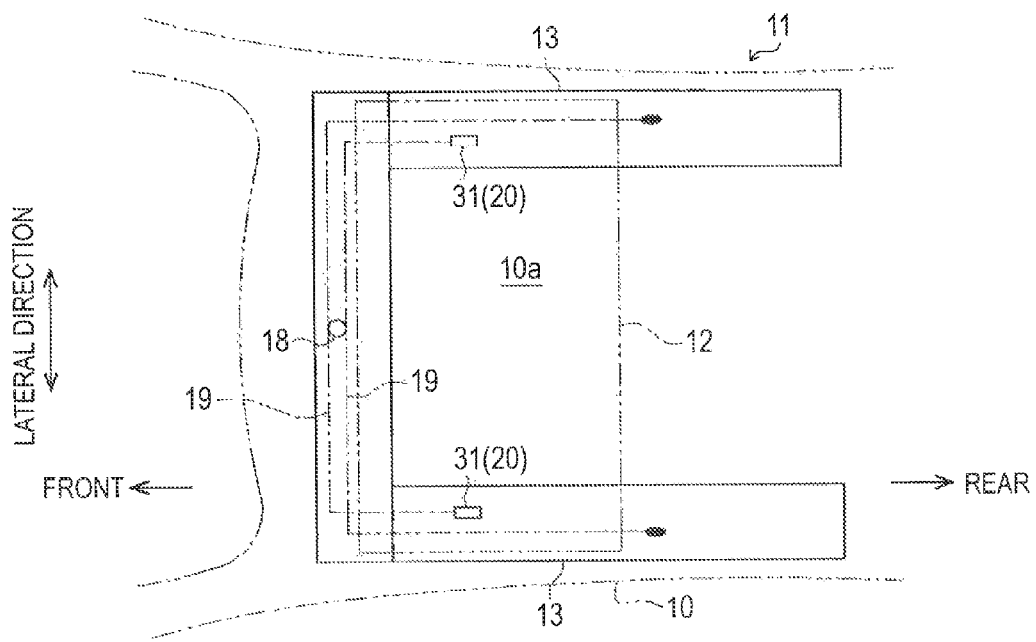
FIG. 2 is a top view illustrating the structure of the sunroof apparatus in the embodiment.

As illustrated in FIG. 2, a pair of guide rails 13 are respectively disposed in both side edge portions of the opening 10a in the lateral direction of the vehicle. Each of the guide rails 13 is made of an extruded aluminum alloy or the like, and extends longitudinally having a uniform cross-section in the longitudinal direction. Functional components 20 are respectively guided and supported by the guide rails 13 such that the functional components 20 can be moved in the longitudinal direction. The movable panel 12 is linked to and supported by both the functional components 20 in a state where the movable panel 12 is bridged therebetween.

An electric motor 18 including an output gear and the like is installed at the front of both the guide rails 13 in the vehicle. The electric motor 18 is connected to the functional components 20 via a pair of substantially belt-shaped drive belts 19, and moves both functional components 20 simultaneously in an extension direction of the guide rails 13. The movable panel 12 is tilted upward or downward, or is slid along with movement of the functional components 20 along the respective guide rails 13 in the longitudinal direction.

Hereinafter, the structure of the sunroof apparatus 11 related to an opening and closing operation and the like of the movable panel 12. The sunroof apparatus 11 includes the structures which are basically related to the opening and closing operation of the movable panel 12, and are provided on both sides of the opening 10a in the lateral direction of the vehicle. Hereinafter, only the structure on one of both sides in the lateral direction of the vehicle will be described.

As illustrated in FIGS. 3A to 3C, each of the guide rails 13 includes a substantially long bottom wall 13a that extends in the longitudinal direction (direction perpendicular to the sheet of FIG. 3B), and a pair of vertical walls 13b which are erected upward from the bottom wall 13a such that the vertical walls 13b are parallel to each other in the longitudinal direction of the vehicle. Each of the guide rails 13 includes a pair of upper walls 13c which respectively protrude from upper ends of the vertical walls 13b in the lateral direction of the vehicle while facing each other, and a pair of intermediate flanges 13d which respectively protrude from vertical intermediate portions of the vertical walls 13b in the lateral direction of the vehicle while facing each other. A projection 13e protrudes downward from a tip of each of the intermediate flanges 13d so as to face the bottom wall 13a, and a projection 13f protrudes upward from the bottom wall 13a so as to face the projection 13e.

In the guide rail 13, the bottom wall 13a, each of the vertical walls 13b, each of the intermediate flanges 13d and the projections 13e and 13f jointly form a first rail portion 14 having a substantially C-shaped section which opens in the lateral direction of the vehicle. In the guide rail 13, each of the vertical walls 13b, each of the upper walls 13c, and each of the intermediate flanges 13d jointly form a second rail portion 15 having a substantially U-shaped section which opens in the lateral direction of the vehicle and is positioned above the first rail portion 14. The drive belt 19 is mounted in the first rail portion 14 on the vehicle interior side such that the drive belt 19 can be slid in the longitudinal direction.

Each of the functional components 20 includes a front shoe 21 which is guided and supported such that the front shoe 21 can be moved along the guide rail 13 in the longitudinal direction, and a rear shoe 31 as a shoe member which is guided and supported at the rear of the front shoe 21 in the vehicle such that the rear shoe 31 can be moved along the guide rail 13 in the longitudinal direction.

The rear shoe 31 is configured to include a first shoe member 32 and a second shoe member 33 which are made of resin, and a body portion 34 made of a metal plate or the like. In a state where the first shoe member 32 is fitted to the drive belt 19, the first shoe member 32 is mounted in the first rail portion 14 on the vehicle interior side such that the first shoe member 32 can be slid in the longitudinal direction. With the intermediate flange 13d interposed between the first rail portion 14 and the second rail portion 15, the first shoe member 32 is mounted in the second rail portion 15 above the first rail portion 14 such that the first shoe member 32 can be slid in the longitudinal direction, and the second shoe member 33 is mounted in the second rail portion 15 on the vehicle exterior side such that the second shoe member 33 can be slid in the longitudinal direction. That is, the first shoe member 32 is connected to the drive belt 19 such that the rear shoe 31 (the functional member 20) is moved integrally with drive belt 19.

As illustrated in FIGS. 5A to 5D, the body portion 34 includes a substantially rectangular bottom wall portion 34a that extends in the longitudinal direction, and a first vertical wall portion 34b and a second vertical wall portion 34c, that is, a pair of vertical wall portions which are respectively erected upward from a vehicle interior side edge portion and a vehicle exterior side edge portion of a longitudinal intermediate portion of the bottom wall portion 34a. The body portion 34 includes a pair of insertion pieces 34d which respectively protrude toward the vehicle interior side from a front end portion and a rear end portion of the bottom wall portion 34a between which the first vertical wall portion 34b on the vehicle interior side is interposed. Both the insertion pieces 34d are inserted into the first shoe member 32 such that the body portion 34 is connected to and is moved integrally with the first shoe member 32 in the longitudinal direction.

The body portion 34 includes a pair of fitting pieces 34e having a substantially L shape which respectively stand upward and protrude toward the vehicle exterior side from a front end portion and a rear end portion of the bottom wall portion 34a between which the second vertical wall portion 34c on the vehicle exterior side is interposed. Both the fitting pieces 34e are fitted to the second shoe member 33 such that the body portion 34 is connected to and is moved integrally with the second shoe member 33 in the longitudinal direction.

The body portion 34 includes an engaging piece 34f having a substantially wave plate-like shape which protrudes from an upper end portion of the first vertical wall portion 34b toward the vehicle exterior side (approaching the second vertical wall portion 34c in the lateral direction of the vehicle), and an engaging pin 34g having a substantially bottomed cylinder shape which is positioned lower than the engaging piece 34f and protrudes from the first vertical wall portion 34b toward the vehicle exterior side (approaching the second vertical wall portion 34c in the lateral direction of the vehicle). The engaging pin 34g is formed integrally with the first vertical wall portion 34b via half blanking or the like. The engaging piece 34f and the engaging pin 34g form an engaging protrusion portion which is an engaging portion. In a state where the rear shoe 31 is supported by the guide rail 13, the engaging piece 34f and the engaging pin 34g are positioned higher than the guide rail 13 (the upper wall 13c).

The body portion 34 includes flanges 35 as a pair of limiting protrusion portions which respectively protrude from a front end edge and a rear end edge of the first vertical wall portion 34b toward the vehicle interior side (becomes more distant from the second vertical wall portion 34c in the lateral direction of the vehicle), and flanges 36 as a pair of limiting protrusion portions which respectively protrude from a front end edge and a rear end edge of the second vertical wall portion 34c toward the vehicle exterior side (becoming more distant from the first vertical wall portion 34*b* in the lateral direction of the vehicle). The flanges 35 and 36 are formed into a substantially rectangular shape.

Figure 4:
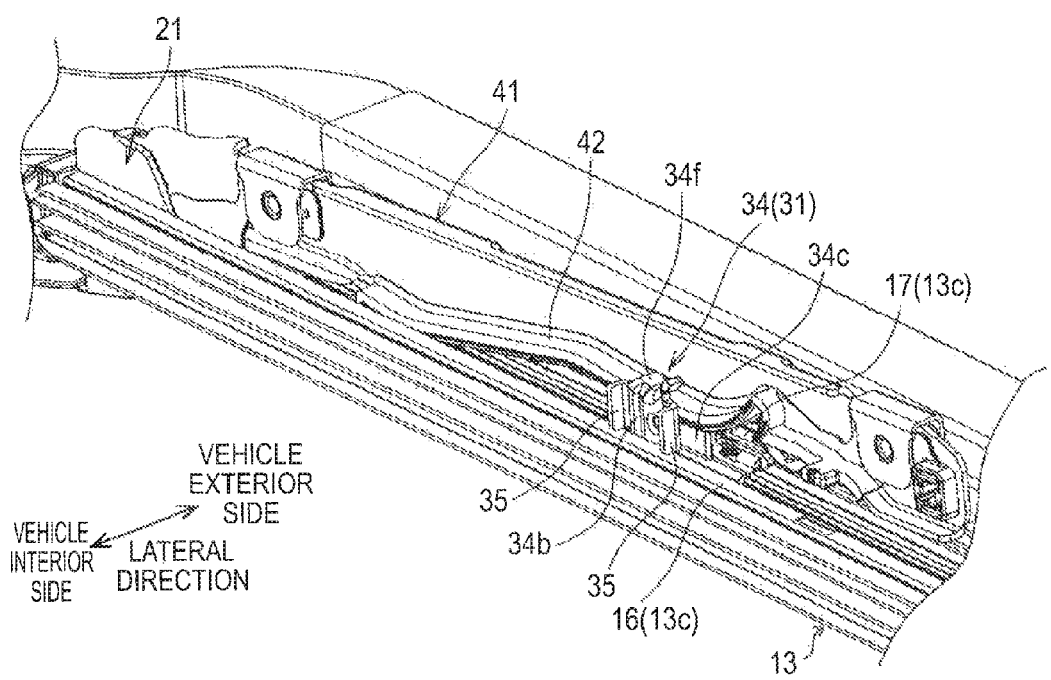
FIG. 4 is a perspective view illustrating the structure of the sunroof apparatus in the embodiment.
Figure 5A:
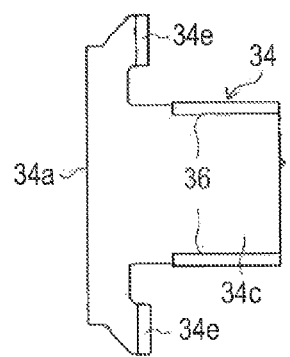
FIGS. 5A to 5D illustrate the structure of a body portion.
Figure 5B:
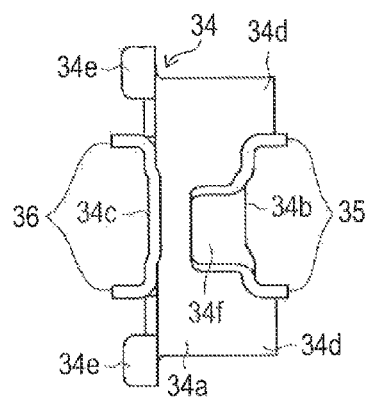
Figure 5C:
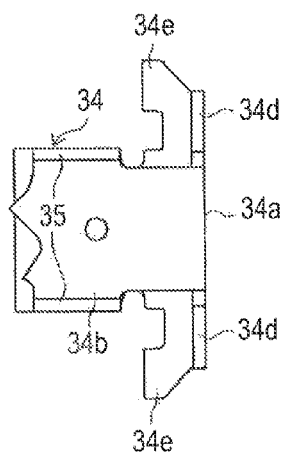
Figure 5D:
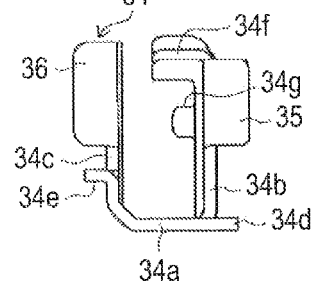

As illustrated in FIGS. 3B, 3C, and 4, in a state where the rear shoe 31 is supported by the guide rail 13, each of the flanges 35 extends at a position higher than an upper surface 16 (upper surface of the guide rail 13) of the upper wall 13*c* on the vehicle interior side, and is in contact with and is close to the upper surface 16. Similarly, each of the flanges 36 extends at a position higher than an upper surface 17 (upper surface of the guide rail 13) of the upper wall 13*c* on the vehicle exterior side, and is in contact with and is close to the upper surface 17.

As described above, in a state where the first shoe member 32 and the second shoe member 33 are mounted in the guide rail 13 such that the first shoe member 32 and the second shoe member 33 can be moved relative to the guide rail 13 in the longitudinal direction, an upper end portion of the body portion 34 (the first vertical wall portion 34*b* and the second vertical wall portion 34*c*) of the rear shoe 31 is disposed higher than the guide rail 13. Both the flanges 35 and both the flanges 36 of the rear shoe 31 are respectively in contact with or are close to the upper surfaces 16 and 17.

As illustrated in FIGS. 3A to 3C, the functional components 20 include support brackets 41 made of a metal plate or the like, which support side edge portions of the movable panel 12 in the lateral direction of the vehicle. Each of the support brackets 41 extends in the longitudinal direction, and a front end portion of the support bracket 41 is connected to the front shoe 21 such that the support bracket 41 can be turned around an axis extending in the lateral direction of the vehicle (direction perpendicular to the sheet of FIG. 3A). The support bracket 41 includes a substantially flange-shaped guide piece 42 that is positioned behind the front shoe 21 in the vehicle and extends from a lower end of the support bracket 41 toward the vehicle interior side. The support bracket 41 is engaged with the rear shoe 31 in a state where the guide piece 42 is interposed in a vertical direction between the engaging piece 34*f* and the engaging pin 34*g* which are provided in the rear shoe 31 (the body portion 34), and movement of the guide piece 42 in the vertical direction is limited. That is, in a state where a vertical movement of the support bracket 41 is limited by the engaging piece 34*f* and the engaging pin 34*g*, the first vertical wall portion 34*b* limits movement of the support bracket 41 toward the vehicle interior side, and the second vertical wall portion 34*c* limits movement of the support bracket 41 toward the vehicle exterior side.

In a fully closed state of the movable panel 12 as illustrated in FIG. 3A, the guide piece 42 is basically inclined upward toward the rear of the vehicle. In the fully closed state of the movable panel 12, the rear shoe 31 (the engaging piece 34*f* and the engaging pin 34*g*) is disposed in a longitudinal intermediate portion of the guide piece 42. Accordingly, when the rear shoe 31 is moved toward the front of the vehicle along the guide rail 13 in the fully closed state of the movable panel 12, the guide piece 42 of the support bracket 41 is pressed upward by the engaging pin 34*g* such that the support bracket 41 is turned around the front end portion in a counterclockwise rotational direction as illustrated. At this time, the movable panel 12 is tilted upward such that the rear portion of the movable panel 12 is moved upward relative to the front portion of the movable panel 12. In contrast, when the rear shoe 31 is moved toward the rear of the vehicle along the guide rail 13 in the fully closed state of the movable panel 12, the guide piece 42 of the support bracket 41 is pressed downward by the engaging piece 34*f*. Accordingly, the movable panel 12 is tilted downward such that the rear portion of the movable panel 12 is moved downward relative to the front portion.

When the movable panel 12 is tilted, a well-known check mechanism (not illustrated) limits longitudinal movement of the front shoe 21 that is pressed by the support bracket 41. When the rear shoe 31 is moved toward the rear of the vehicle along the guide rail 13, and the engaging piece 34*f* and the engaging pin 34*g* reach a trailing end (rear end) of the guide piece 42, the tilt-down operation of the movable panel 12 ends. At this, the limitation to the movement of the front shoe 21 toward the rear of the vehicle, which is imposed by the check mechanism is released. Accordingly, when the rear shoe 31 is further moved toward the rear of the vehicle along the guide rail 13, the support bracket 41 and the front shoe 21 are integrally moved toward the rear of the vehicle, and the movable panel 12 is opened in a tilt-down state. As a result, the movable panel 12 is brought into a fully open state, and the opening 10*a* is opened.

In contrast, it is assumed that the rear shoe 31 is moved to the front of the vehicle along the guide rail 13 in the fully open state of the movable panel 12. At this time, the check mechanism limits turning of the support bracket 41 around the front end portion. Accordingly, the support bracket 41 and the front shoe 21 are integrally moved toward the front of the vehicle, and the movable panel 12 is closed in a tilt-down state. When the movable panel 12 returns to a state in which the tilt-down operation is ended, the limitation to the turning of the support bracket 41 is released and longitudinal movement of the front shoe 21 is limited by the check mechanism. Accordingly, when the rear shoe 31 is further moved toward the front of the vehicle along the guide rail 13 in this state, the guide piece 42 of the support bracket 41 is pressed upward by the engaging pin 34*g*. As a result, the movable panel 12 is tilted upward such that the rear portion of the movable panel 12 is moved upward relative to the front portion, the movable panel 12 returns to the fully closed state.

Hereinafter, an operation in the embodiment will be described. As illustrated by the solid line in FIG. 6, in a state where the rear shoe 31 is supported by the guide rail 13, each of the flanges 35 is in contact with or is close to the upper surface 16 of the upper wall 13*c* on the vehicle interior side, and each of the flanges 36 is in contact with or is close to the upper surface 17 of the upper wall 13*c* on the vehicle exterior side. Accordingly, in a case where bending moment around the axis extending substantially along the longitudinal direction is applied to the rear shoe 31, the rear shoe 31 is deformed around the axis according to the bending moment. At this time, regardless of the longitudinal position of the rear shoe 31, that is, regardless of the posture of the movable panel 12, the deformation of the rear shoe 31 is limited by contact between both flanges 35 and the upper surfaces 16 or contact between both flanges 36 and the upper surfaces 17.

Figure 6:
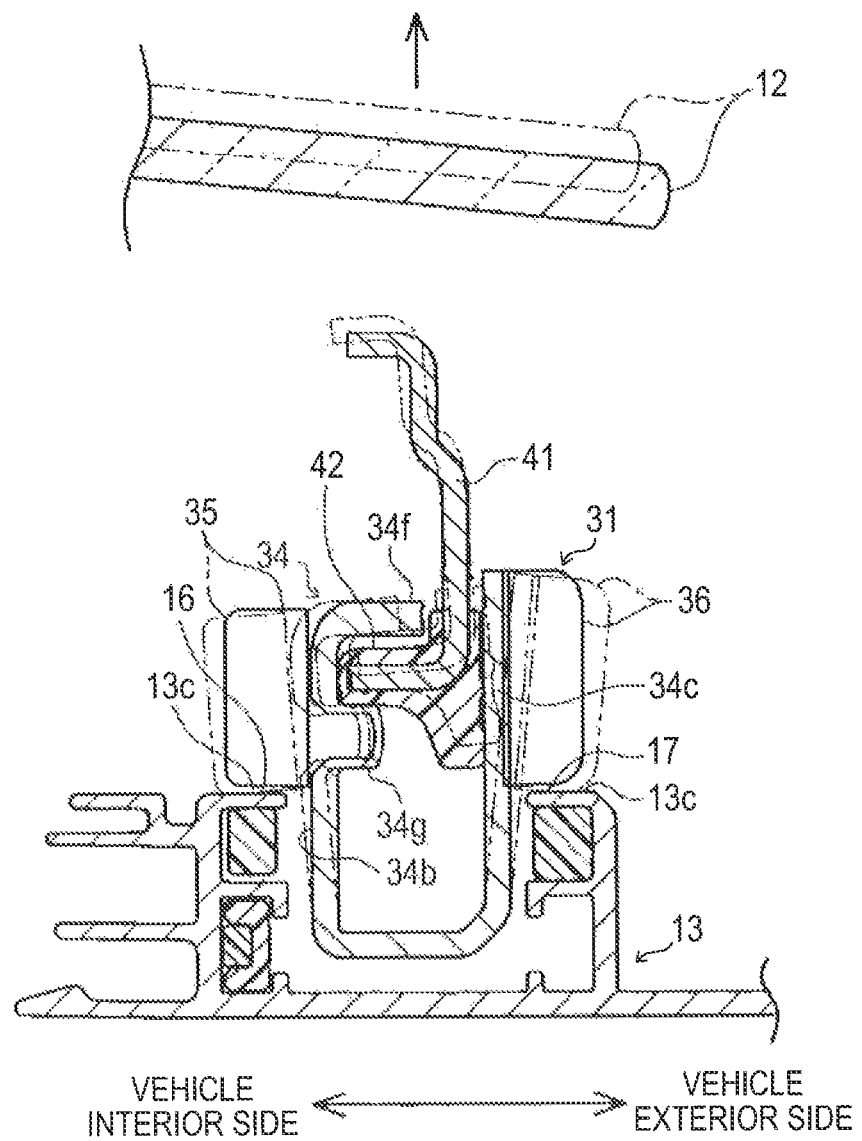
FIG. 6 is a sectional view illustrating the operation of the sunroof apparatus in the embodiment.

For example, as illustrated by the two point chain line in FIG. 6, in a case where an upward load is applied to the movable panel 12, the engaging piece 34*f* is pressed by the support bracket 41 (the guide piece 42) which is moved upward along with the movable panel 12. As a result, the first vertical wall portion 34*b* is bent around the axis substantially along the longitudinal direction such that the engaging piece 34*f* is moved away from the support bracket 41. At the same time, the second vertical wall portion 34*c* is bent around the axis, which extends substantially along the longitudinal direction, in a direction opposite to a bending direction of the first vertical wall portion 34*b*. That is, the first vertical wall portion 34*b* and the second vertical wall portion 34c are bent in such a way as to be moved away from each other. In contrast, the deformation of the first vertical wall portion 34b is limited by contact between both the flanges 35 and the upper surfaces 16, and the deformation of the second vertical wall portion 34c is limited by contact between both the flanges 36 and the upper surfaces 17.

As described above in detail, according to the embodiment, it is possible to obtain the following effects.

(1) In the embodiment, regardless of the longitudinal position of the rear shoe 31, deformation of the rear shoe 31 around the axis extending substantially along the longitudinal direction is limited by contact between both the flanges 35 and the upper surfaces 16, or contact between both the flanges 36 and the upper surfaces 17. As such, it is possible to easily ensure strength of the rear shoe 31 in the lateral direction of the vehicle only by providing the flanges 35 and 36 in a protruding manner.

(2) In the embodiment, the rear shoe 31 includes the body portion 34 made of a plate, of which the engaging portion (the engaging piece 34f and the engaging pin 34g) is disposed to protrude at a position higher than the guide rail 13 and is engaged with the support bracket 41. Both the flanges 35 extend from the body portion 34 (the first vertical wall portion 34b) toward the vehicle interior side and is positioned higher than the upper surface 16. Both the flanges 36 extend from the body portion 34 (the second vertical wall portion 34c) toward the vehicle exterior side and is positioned higher than the upper surface 17. Accordingly, it is possible to form both the flanges 35 and both the flanges 36 integrally with the body portion 34 during bending of a metal plate. That is, it is possible to form both the flanges 35, both the flanges 36, and the body portion 34 using a piece of metal plate. As a result, it is possible to reduce manufacturing man hours and costs.

Since each of the flanges 35 extends at a position higher than the upper surface 16, when the rear shoe 31 is bent as described above, load is applied to each of the flanges 35, which are pressed by the upper surfaces 16, across substantially the entire vertical length of each of the flanges 35. As a result, it is possible to reliably limit the deformation. Similarly, since each of the flanges 36 extends at a position higher than the upper surface 17, when the rear shoe 31 is bent as described above, load is applied to each of the flanges 36, which are pressed by the upper surfaces 17, across substantially the entire vertical length of each of the flanges 36. As a result, it is possible to reliably limit the deformation.

(3) In the embodiment, for example, in a case where an upward load is applied to the movable panel 12, the engaging piece 34f is pressed by the support bracket 41 (the guide piece 42) which is moved upward along with the movable panel 12. As a result, the first vertical wall portion 34b is bent around the axis substantially along the longitudinal direction such that the engaging piece 34f is moved away from the support bracket 41. In contrast, since the flanges 35 protrude from the first vertical wall portion 34b toward the vehicle interior side, that is, since the flanges 35 protrude in the lateral direction of the vehicle so as to prevent the bending deformation of the first vertical wall portion 34b, it is possible to reduce the possibility of the movable panel 12 detaching from both the rear shoes 31 along with the support brackets 41.

(4) In the embodiment, it is possible to further reduce the possibility of the movable panel 12 detaching from both the rear shoes 31 along with both the support brackets 41, due to joint efforts of both the flanges 35 provided in the first vertical wall portion 34b and both the flanges 36 provided in the second vertical wall portion 34c.

(5) In the embodiment, since the pair of the flanges 35 are respectively positioned in the longitudinal direction such that the engaging piece 34f and the engaging pin 34g of the first vertical wall portion 34b are interposed between the flanges 35, it is possible to further reduce the possibility of the movable panel 12 detaching from both the rear shoes 31 along with both the support brackets 41, due to joint efforts of both the flanges 35.

(6) In the embodiment, in a case where both the flanges 35 are close to the upper surface 16 and both the flanges 36 are close to the upper surface 17 during normal usage of the sunroof apparatus 11, that is, in a case where vertical gaps are respectively formed between both the flanges 35 and the upper surface 16 and between both the flanges 36 and the upper surface 17, it is possible to eliminate effects of both the flanges 35 and 36 on the operation of the rear shoe 31 that is slid against the guide rail 13.

(7) In the embodiment, since it is not necessary to adopt a high-strength material or a very thick material as the material of the body portion 34 (the rear shoe 31), it is possible to further reduce manufacturing man hours or costs of the body portion 34 during pressing.

(8) In the embodiment, since a vertical position relationship between the flanges 35 and 36 and the guide rail 13 is not changed regardless of the longitudinal position of the rear shoe 31, it is possible to limit the deformation of the rear shoe 31 in an arbitrary posture (a closed state, a tilt-up state, a tilt-down state, or an open state) of the movable panel 12.

The embodiment may be changed as described below.

Figure 7:
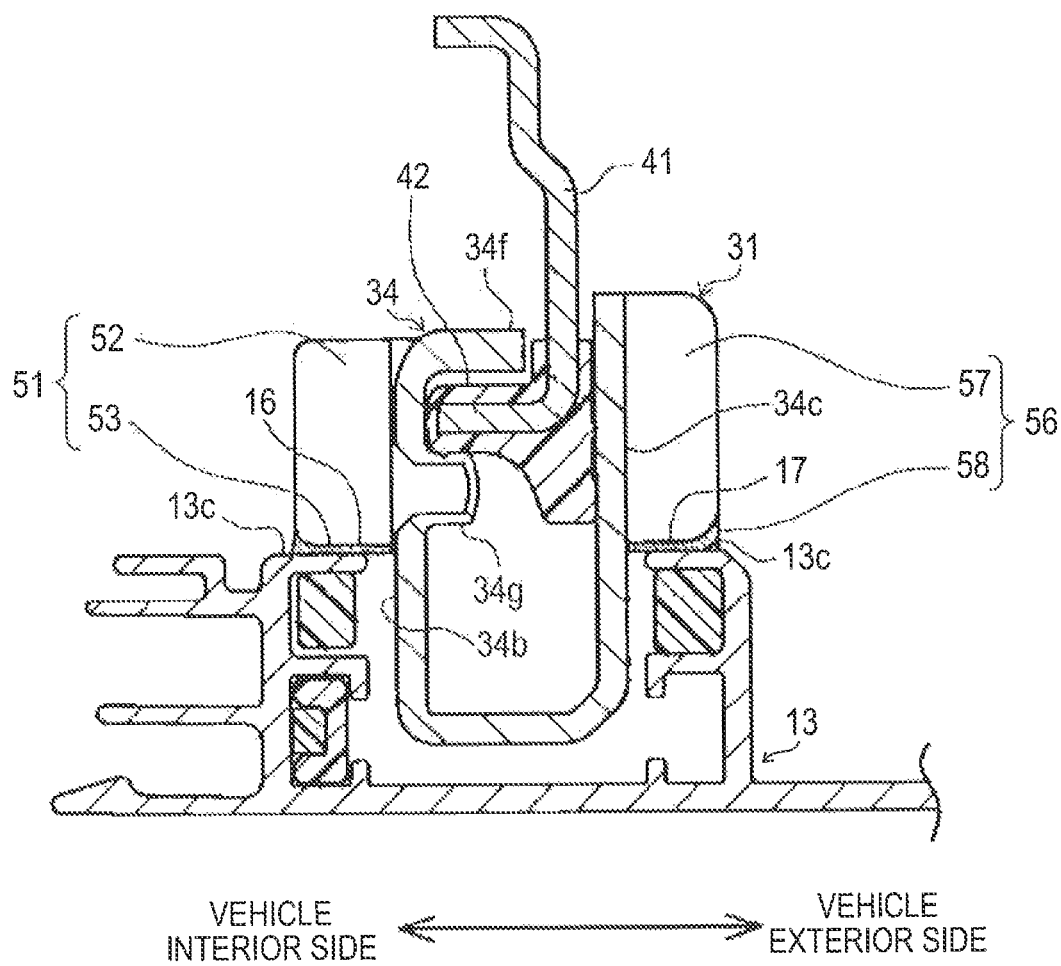
FIG. 7 is a sectional view illustrating the structure of a sunroof apparatus in a modification example.

As illustrated in FIG. 7, instead of the flange 35, a flange 51 may be adopted which is always in contact with the upper surface 16. In this case, the flange 51 may be configured to include a flange portion 52 that is formed integrally with the body portion 34 (the first vertical wall portion 34b), and a contact portion 53 that is connected to a lower end of the flange portion 52 and is made of resin (fluororesin such as TEFLON (trademark)) having a low friction coefficient. Similarly, instead of the flange 36, a flange 56 may be adopted which is always in contact with the upper surface 17. In this case, the flange 56 may be configured to include a flange portion 57 that is formed integrally with the body portion 34 (the second vertical wall portion 34c), and a contact portion 58 that is connected to a lower end of the flange portion 57 and is made of resin having a low friction coefficient.

In the embodiment, the front shoe 21 may be omitted, and the front end portion of the support bracket 41 may be directly supported by the guide rail 13.

In the embodiment, the engaging piece 34f and the engaging pin 34g may be positioned lower than the guide rail 13 (the upper surfaces 16 and 17).

In the embodiment, either of both the flanges 35 and 36 may be omitted.

In the embodiment, one flange 35 and one flange 36 may be provided, or three or more flanges 35 and three or more flanges 36 may be lined up in the longitudinal direction. The flanges 35 and 36 are preferably disposed to be capable of more stabilizing the posture of the rear shoe 31 and preventing the bending deformation of the rear shoe 31.

In the embodiment, the flanges 35 formed integrally with the body portion 34 (the first vertical wall portion 34b) are adopted. Alternatively, for example, a pin-shaped limiting protrusion portion may be adopted which protrudes from the body portion 34 toward the vehicle interior side while being formed integrally or separately from the body portion 34.

Similarly, the flanges 36 formed integrally with the body portion 34 (the second vertical wall portion 34c) are adopted. Alternatively, for example, a pin-shaped limiting protrusion portion may be adopted which protrudes from the body portion 34 toward the vehicle exterior side while being formed integrally or separately from the body portion 34. One limiting protrusion portion may be provided, or multiple limiting protrusion portions may be lined up in the longitudinal direction.

In the embodiment, an inversion of a dispositional relationship between the first vertical wall portion 34b (including the engaging piece 34f and the engaging pin 34g) on the vehicle interior side and the second vertical wall portion 34c on the vehicle exterior side may be made.

In the embodiment, a guide protrusion portion protruding from the first vertical wall portion 34b toward the vehicle exterior side may be engaged into a guide groove of the support bracket 41 which is recessed in the lateral direction of the vehicle, such that the rear shoe 31 is engaged with the support bracket 41. The guide groove has the same locus as that of the guide piece 42.

In the embodiment, the support bracket may include a pair of vertical wall portions which are provided side by side in the lateral direction of the vehicle, and the rear shoe may include a body portion that is interposed between the pair of vertical wall portions.

This disclosure may be applied to an outer sliding-type sunroof apparatus. Alternatively, this disclosure may be applied to a sunroof apparatus in which a slide operation cannot be enabled by only a tilt operation, or may be applied to a sunroof apparatus in which a tilt operation cannot be enabled by only a slide operation.

A sunroof apparatus according to an aspect of this disclosure includes: a movable panel that is adapted to open and close an opening formed in a roof of a vehicle; a guide rail that is provided in each edge portion of the opening in a lateral direction of the vehicle, and extends in a longitudinal direction of the vehicle; a support bracket that includes a front end portion supported by the guide rail, and supports each edge portion of the movable panel in the lateral direction of the vehicle; and a shoe member which is provided such that the shoe member can be moved along the guide rail in the longitudinal direction of the vehicle, and which is engaged with the support bracket. The movable panel is opened and closed along with movement of the shoe member in the longitudinal direction of the vehicle. The shoe member includes a limiting protrusion portion that protrudes in the lateral direction of the vehicle at a position higher than an upper surface of the guide rail, and is in contact with or is close to the upper surface.

According to this configuration, in a case where bending moment around an axis extending substantially along the longitudinal direction of the vehicle is applied to the shoe member that is engaged with the support bracket, the shoe member is deformed around the axis according to the bending moment. At this time, regardless of the position of the shoe member in the longitudinal direction of the vehicle, the deformation of the shoe member is limited by contact between the limiting protrusion portion and the upper surface of the guide rail. As such, it is possible to easily ensure strength of the shoe member in the lateral direction of the vehicle only by providing the limiting protrusion portion in a protruding manner.

In the sunroof apparatus, it is preferable that the shoe member includes a body portion made of a plate including an engaging portion which is disposed to protrude at a position higher than the guide rail and is engaged with the support bracket, and the limiting protrusion portion is a flange that extends from the body portion in the lateral direction of the vehicle at a position higher than the upper surface of the guide rail.

In this configuration, it is possible to form the flange as the limiting protrusion portion integrally with the body portion during bending of the plate, and it is possible to further reduce manufacturing man hours.

In the sunroof apparatus, it is preferable that the body portion includes a pair of vertical wall portions which are provided side by side in the lateral direction of the vehicle and between which the support bracket is interposed, the engaging portion is an engaging protrusion portion that protrudes from a first vertical wall portion, which is one of the vertical wall portions, in the lateral direction of the vehicle while approaching a second vertical wall portion which is the other of the vertical wall portions, and that limits vertical movement of the support bracket, and the flange protrudes from the first vertical wall portion in the lateral direction of the vehicle while becoming more distant from the second vertical wall portion.

In this configuration, for example, in a case where an upward load is applied to the movable panel, the guide protrusion portion is pressed by the support bracket which is moved upward along with the movable panel. As a result, the first vertical wall portion is bent around the axis substantially along the longitudinal direction of the vehicle such that the guide protrusion portion is moved away from the support bracket. In contrast, since the flange protrudes from the first vertical wall portion in the lateral direction of the vehicle while becoming more distant from the second vertical wall portion, that is, since the flange protrudes in the lateral direction of the vehicle so as to prevent the bending deformation of the first vertical wall portion, it is possible to further reduce the possibility of the movable panel detaching from both the shoe members along with both the support brackets.

In the sunroof apparatus, it is preferable that the flange protrudes from the second vertical wall portion in the lateral direction of the vehicle while becoming more distant from the first vertical wall portion.

In this configuration, it is possible to further reduce the possibility of the movable panel detaching from both the shoes members along with both the support brackets, due to joint efforts of both the flanges provided in the first vertical wall portion and the second vertical wall portion.

In the sunroof apparatus, it is preferable that a pair of the flanges are respectively positioned in the longitudinal direction of the vehicle such that the engaging protrusion portion is interposed between the flanges.

In this configuration, it is possible to further reduce the possibility of the movable panel detaching from both the shoe members along with both the support brackets, due to joint efforts of the pair of flanges provided in the first vertical wall portion.

According to the configuration of this disclosure, it is possible to easily ensure strength of the shoe member in the lateral direction of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
a movable panel that is adapted to open and close an opening formed in a roof of a vehicle;
a guide rail that is provided in each edge portion of the opening in a lateral direction of the vehicle, and extends in a longitudinal direction of the vehicle;
a support bracket that includes a front end portion supported by the guide rail, and supports each edge portion of the movable panel in the lateral direction of the vehicle;
a shoe member which is provided such that the shoe member can be moved along the guide rail in the longitudinal direction of the vehicle, and which is engaged with the support bracket; and
a drive belt which moves the support bracket in an extension direction of the guide rail,
wherein the movable panel is opened and closed along with movement of the shoe member in the longitudinal direction of the vehicle,
wherein the shoe member includes a body portion made of a plate including an engaging portion which is disposed to protrude at a position higher than the guide rail and is engaged with the support bracket, and
wherein the shoe member includes vertical flanges made of plates that extend from the body portion in interior and exterior directions of the vehicle at a position higher than an upper surface of the guide rail and are in contact with or are close to the upper surface.

2. The sunroof apparatus according to claim 1,
wherein the flanges overlaps the engaging portion in the lateral direction of the vehicle.

3. The sunroof apparatus according to claim 1,
wherein the body portion includes a pair of vertical wall portions which are provided side by side in the lateral direction of the vehicle and between which the support bracket is interposed,
wherein the engaging portion is an engaging protrusion portion that protrudes from a first vertical wall portion, which is one of the vertical wall portions, in the lateral direction of the vehicle while approaching a second vertical wall portion which is the other of the vertical wall portions, and that limits vertical movement of the support bracket, and
wherein one flange protrudes from the first vertical well portion in the lateral direction of the vehicle while becoming more distant from the second vertical wall portion.

4. The sunroof apparatus according to claim 3,
wherein another flange protrudes from the second vertical wall portion in the lateral direction of the vehicle while becoming more distant from the first vertical well portion.

5. The sunroof apparatus according to claim 3,
wherein one flange is respectively positioned in the longitudinal direction of the vehicle such that the engaging protrusion portion is interposed between the flanges.

6. The sunroof apparatus according to claim 4,
wherein the another flange is respectively positioned in the longitudinal direction of the vehicle such that the engaging protrusion portion is interposed between the flanges.

* * * * *